No. 620,642. Patented Mar. 7, 1899.
I. W. COLBURN.
GLASS WORKING MACHINE.
(Application filed Apr. 27, 1898.)
(No Model.) 7 Sheets—Sheet 1.
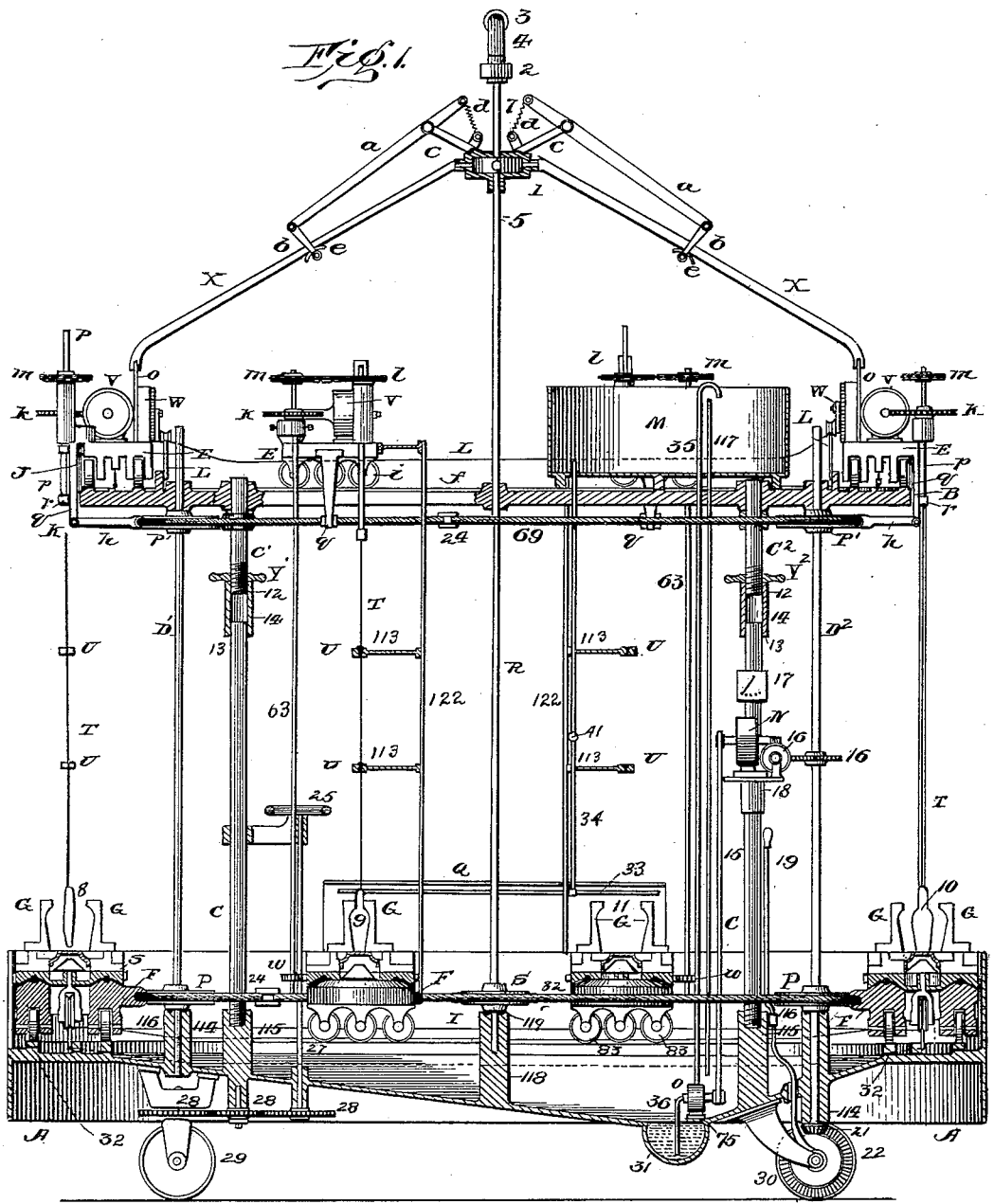
Witnesses:
Inventor
Irving W. Colburn,
by Henry H. Bates,
Attorney.

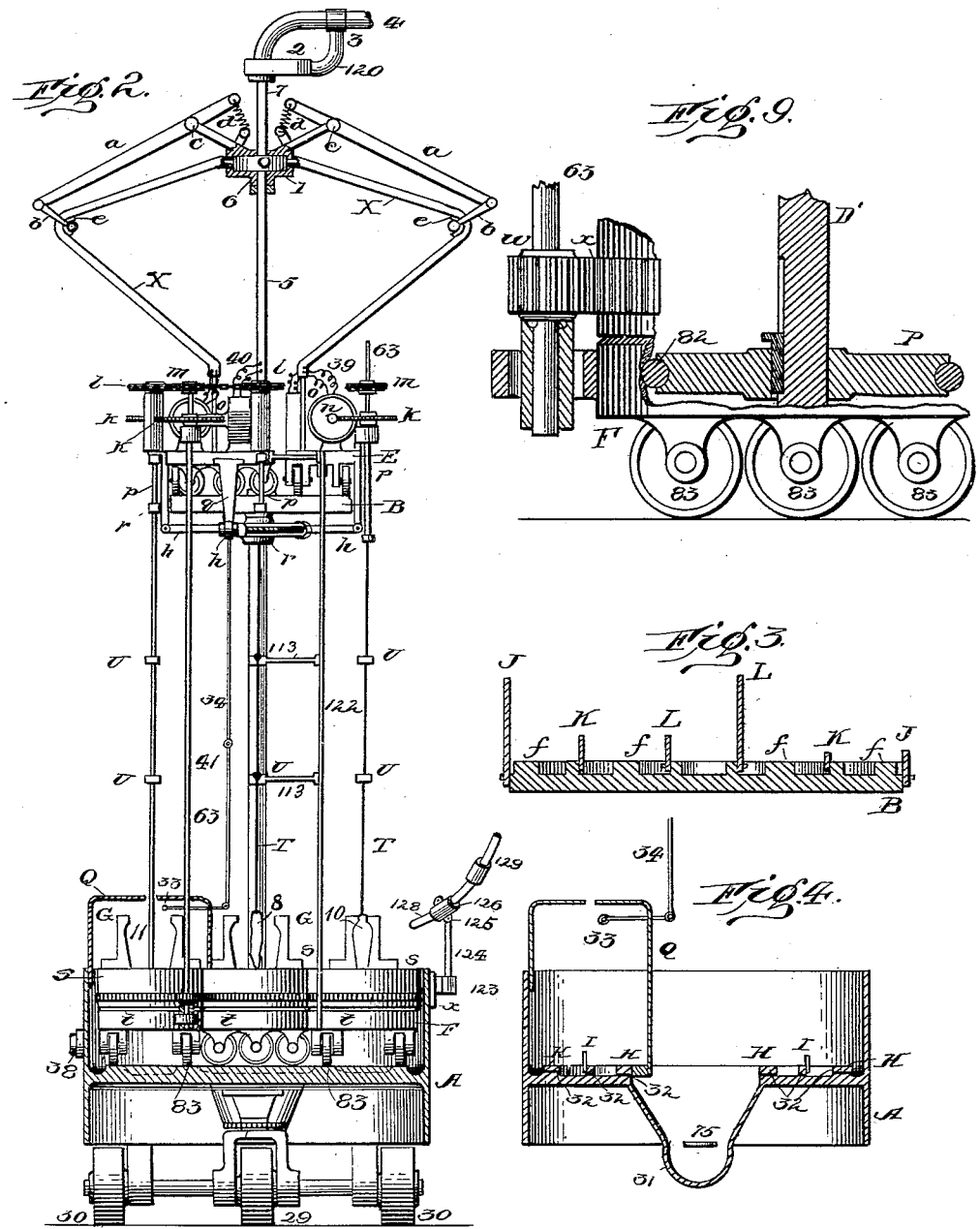

No. 620,642. Patented Mar. 7, 1899.
I. W. COLBURN.
GLASS WORKING MACHINE.
(Application filed Apr. 27, 1898.)
(No Model.) 7 Sheets—Sheet 3.
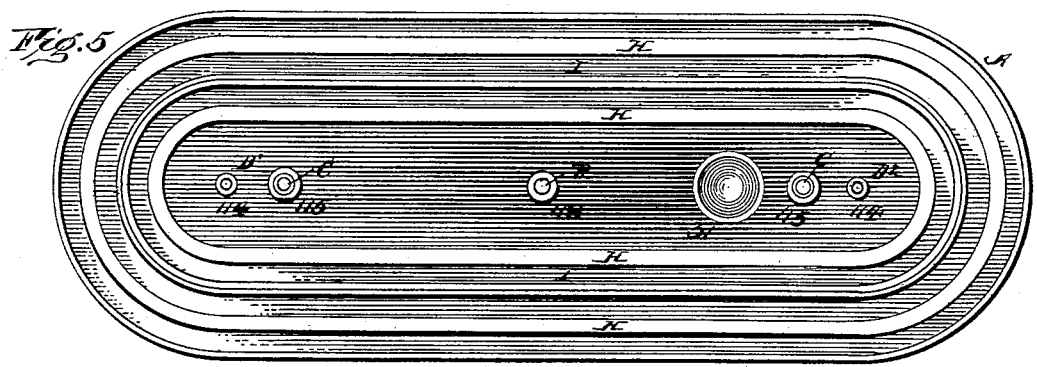
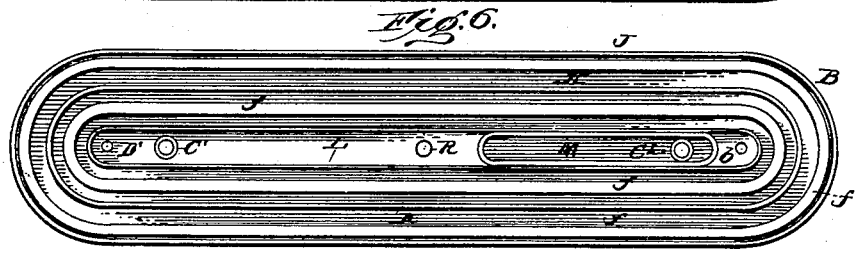
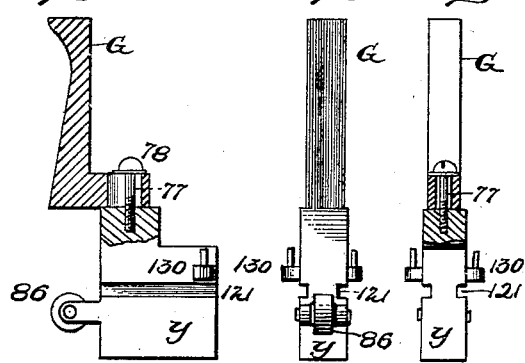
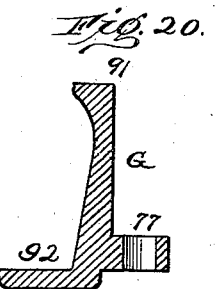
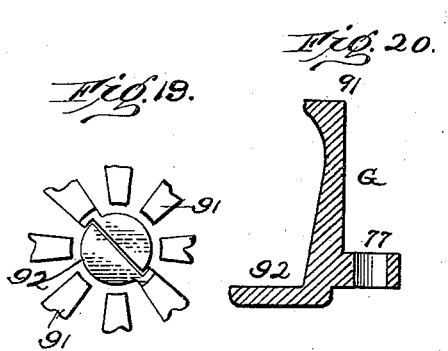
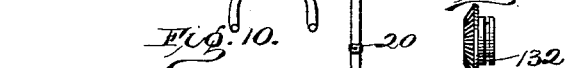
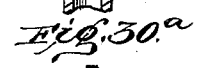
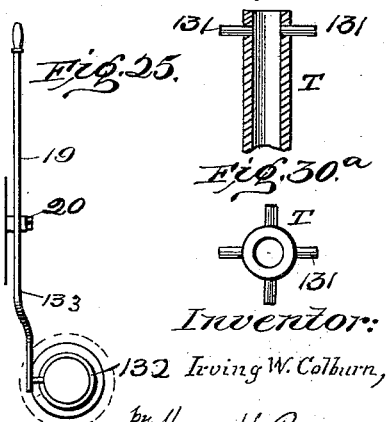
Witnesses:
J. M. Fowler Jr.
Walter B. Payne
Inventor:
Irving W. Colburn,
by Henry H. Bates
Attorney.
THE NORRIS PETERS CO., PHOTO-LITHO., WASHINGTON, D. C.

No. 620,642. Patented Mar. 7, 1899.
I. W. COLBURN.
GLASS WORKING MACHINE.
(Application filed Apr. 27, 1898.)
(No Model.) 7 Sheets—Sheet 4.
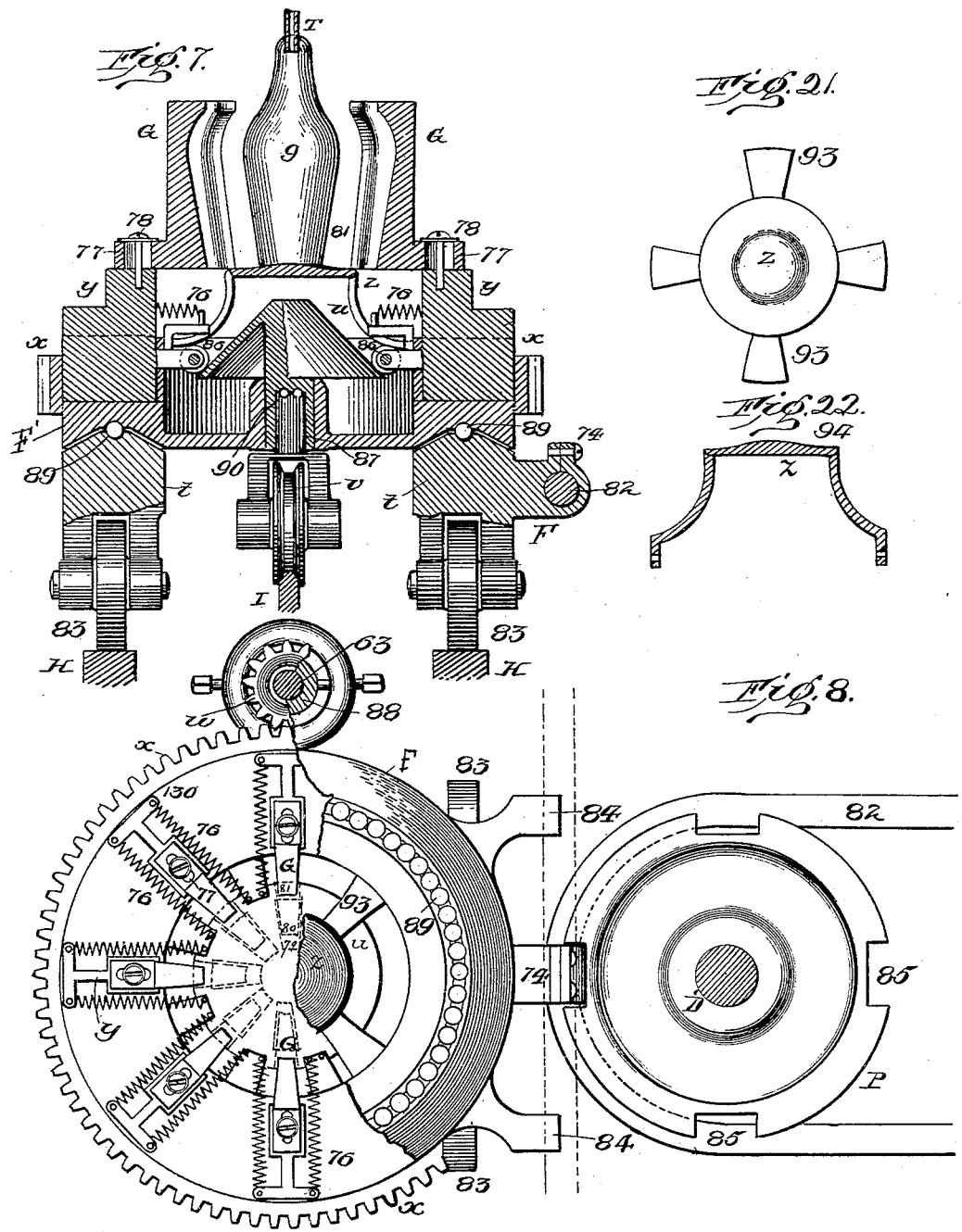
Witnesses:
J. M. Fowler Jr.
Walter B. Payne.
Inventor:
Irving W. Colburn,
by Henry H. Bates,
Attorney.

No. 620,642. Patented Mar. 7, 1899.
I. W. COLBURN.
GLASS WORKING MACHINE.
(Application filed Apr. 27, 1898.)
(No Model.) 7 Sheets—Sheet 5.
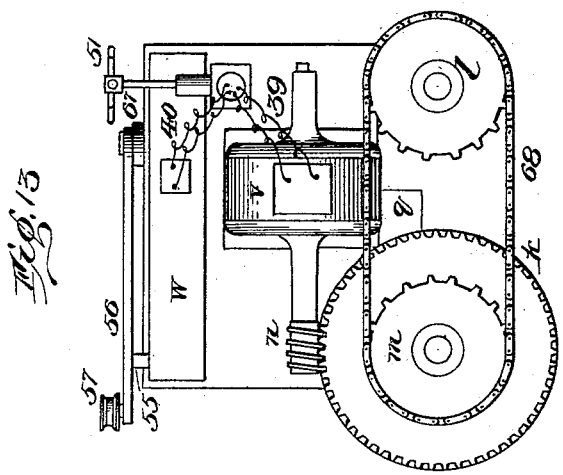
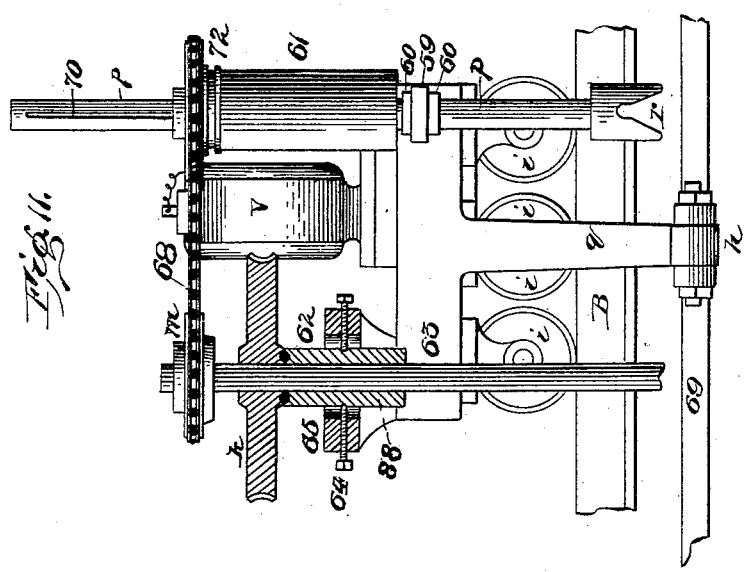
Witnesses:
J. M. Fowler Jr.
Walter P. Payne
Inventor:
Irving W. Colburn,
by Henry H. Bates
Attorney.

No. 620,642.  
I. W. COLBURN.  
GLASS WORKING MACHINE.  
(Application filed Apr. 27, 1898.)  
Patented Mar. 7, 1899.
(No Model.)  
7 Sheets—Sheet 6.
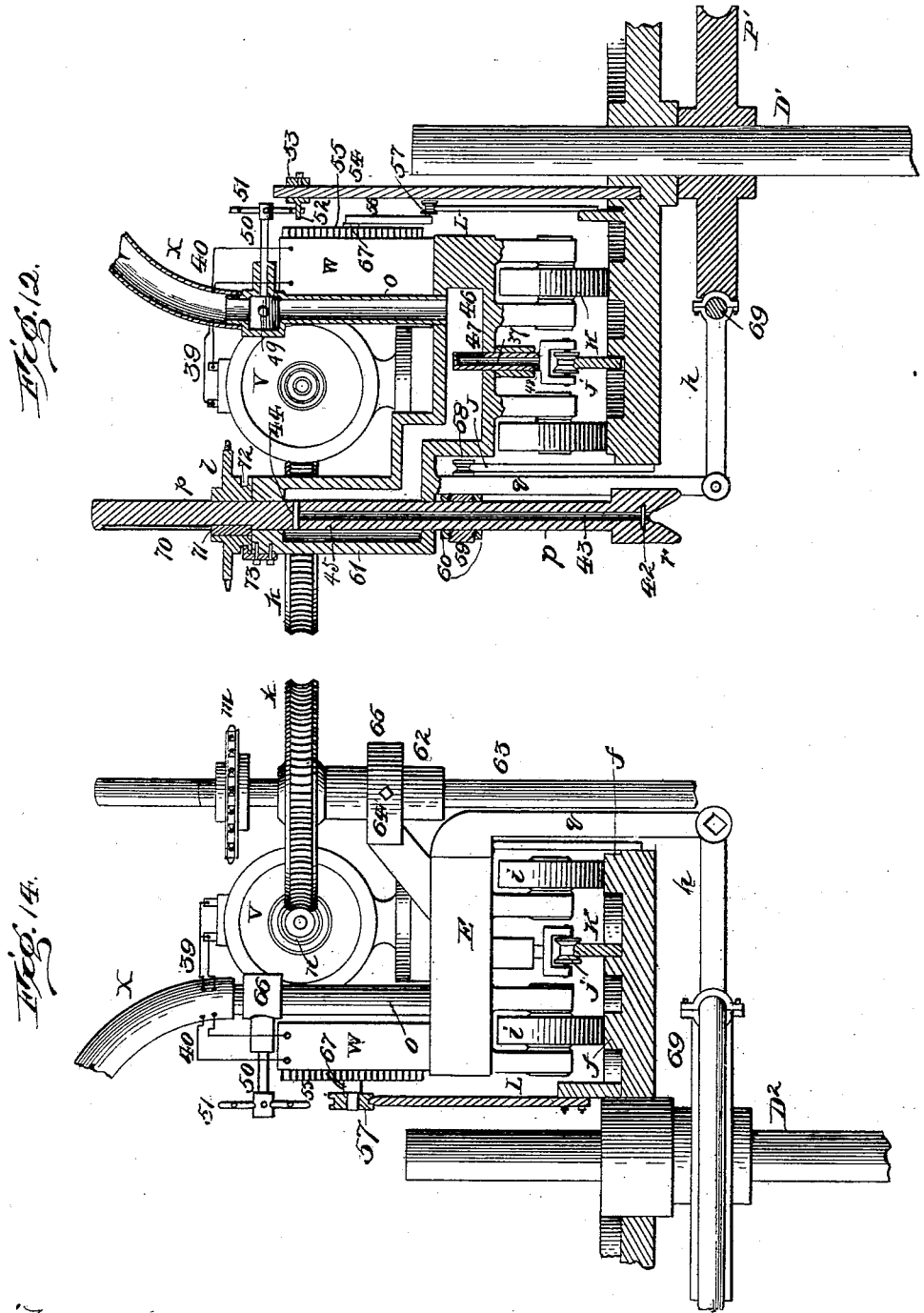
Witnesses:  
J. W. Fowler Jr.  
Walter B. Payne.
Inventor,  
Irving W. Colburn,  
by Henry H. Bates,  
Attorney.

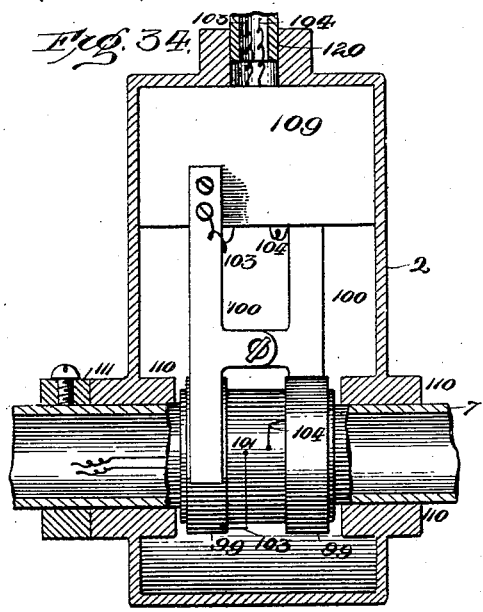

UNITED STATES PATENT OFFICE.

IRVING W. COLBURN, OF TOLEDO, OHIO.

GLASS-WORKING MACHINE.

SPECIFICATION forming part of Letters Patent No. 620,642, dated March 7, 1899.

Application filed April 27, 1898. Serial No. 679,003. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for forming and manufacturing articles of glass, such as have heretofore been made by blowing in connection with sectional molds, either purely by manual process or in conjunction with machinery. By my present means I dispense with molds and form the article by means of slickers, fingers, or modelers, by which the plastic glass is ironed, kneaded, and modeled into shape as it revolves in contact with said slickers or fingers or as the latter are revolved around the plastic glass, or both in conjunction. The action thus differs radically from that which takes place when sectional molds are employed, as in the prior practice of machine glass-working, with the advantage of the avoidance of fins, striæ, and wrinkles on the surface of the glass, due to contraction in contact with a metallic chill-surface, and torsion strains and cleavage-lines in the glass, along which fracture is liable to occur in articles produced by the old method. Owing to the kneading and modeling action of the fingers or slickers larger articles than hitherto practicable by machinery may be executed and by means of labor of only ordinary skill in contrast with the highly-skilled labor hitherto found indispensable.

In the drawings forming a part of this specification, Figure 1 is a side elevation of the machine, partly in section. Fig. 2 is an end elevation of the machine, partly in section. Fig. 3 is an end section of top frame of the machine, showing the tracks on which the upper car-wheels run, also the cam-tracks on which the flange-wheels run which operate the rheostat, the air-discharge-regulating valve, and the device which lifts the air or blow-iron spindle. Fig. 4 is a transverse section of the bottom frame of the machine, showing the tracks on which wheels of the bottom slicker-cars run, also the cam-track on which runs the flange-wheel that operates the lifting-cone which works the slickers in and out. It also shows the bottom water-well and sprinkling-housing and sprinkling or wetting pipes. Fig. 5 is a plan view of the base of the machine, showing plain tracks and cam-tracks, water-well, and two shafts and two upright columns. Fig. 6 is a plan view of the top frame of the machine, showing tracks for upper cars and cam-tracks, also columns and upright shafts, also upper water-tank. Fig. 7 is an end elevation, partly in section, showing the bottom slicker-car. Fig. 8 is a plan of bottom slicker-car, partly in section, showing also a portion of cable-wheel, cable, and means of connection. Fig. 9 is an end elevation, partly in section, showing operating mechanism for revolving the bottom part of slickers around the glass bulb. Fig. 10, Sheet 3, is a view of a portion of the forked lever for actuating clutch mechanism for locomotive purposes. Fig. 11 is a front elevation, partly in section, of the top motor and air car. Fig. 12, Sheet 6, is an end elevation, partly in section, of top motor-car, showing air-regulating device, spindle-lifting device, and rheostat-arm-lifting device, also knocker-valve for shutting off or on the air-supply from flexible shaft, also attachment to drive the wire cable. Fig. 13, Sheet 5, is a plan view of top motor-car. Fig. 14, Sheet 6, is an end elevation, partly in section, showing driving power device. Figs. 15, 16, 17, and 18, Sheet 3, are views showing slickers with attached parts in various positions. Fig. 19, Sheet 3, is a plan view illustrating slickers when constructed so as to form the bottom of an article with the same slicker. Fig. 20 is a vertical sectional view of said slicker. Figs. 21 and 22, Sheet 4, are plan and vertical sectional views showing bottom former or slicker for giving shape to bottom of glass article. Figs. 23, 24, and 25, Sheet 3, are views showing device for making a locomotive-car out of the machine for convenience in moving it from place to place. Fig. 26, Sheet 7, is a plan of the lower cable-operating device, showing arrangement for operating central shaft by impulses one-eighth of a turn at an impulse. Figs. 27 and 28 are views in transverse and longitudinal section, showing valve for shutting off and turning on the air, carried on top motor-car. Fig. 29, Sheet 7, is a side view of the starting and stopping and speed-regulating electric rheostat. Figs. 30 and 30ª, Sheet 3, show the upper end of blow-iron in plan and vertical section. Fig. 31, Sheet 7, is a vertical section of one of the bearings for blow-iron to run in, showing the removable composition metal bushing. Fig. 32, Sheet 7, is a plan view of same bearing or support. Fig. 33, Sheet 7, is an elevation of a portion of the blow-iron, showing enlargement for supporting same in the bearing for the blow-iron on which it turns or revolves when in operation. Fig. 34, Sheet 7, is a longitudinal section, in part full, of the commutator device for carrying electric current to the machine without twisting the wires when the machine is in operation. Fig. 35, Sheet 7, is a transverse section of the same electric commutator.

Like letters and numerals of reference indicate like parts on the several drawings.

Referring to the drawings, A represents the base part or bottom frame of the machine. The base A is the frame upon which all the machine is assembled.

B is the top part or frame-plane, supported on base A by columns C C. On base A are two upright bosses or extended hubs 115, into which are inserted and preferably screwed the said columns. These columns are made in two pieces C C' C C², with couplings 14 made fast to columns C at 13. The upper portions C' C² of said columns have screw-threads cut on them at 12 and hand-wheels Y' Y², screw-threaded inside, fitting the same to provide for raising or lowering the top part or frame-plane B to accommodate different kinds of work in process in the machine.

The base A (see Fig. 5) has three tracks running around the same. Two, H H, are level tracks, on which run the car-wheels of cars F. The middle track or cam-track I is of varying height, according to the duty that it is expected to perform. This cam-track is preferably formed of light bar iron or steel and made removable and adjustable, so that it can be easily changed and a different one put in its place. Said track is held in position with suitable means for adjustment, and the variations of level are fashioned in accordance with the work in hand. In the lower part of the base A is the well 31 for holding water, having a shelf 75, on which the pump O is placed for pumping water to the tank M on top of the machine.

Q is a long metal housing supported on base A. In this housing the slickers get a most complete wetting and cooling, and whatever water falls outside the main water-basin or between the tracks at once finds its way back to the tank 31. There are holes or passages 32, Figs. 1 and 4, under the tracks H H to accommodate the return of such water.

The object of the housing Q, above referred to, is to prevent water from escaping outside the machine while wetting and cooling the slickers. In this housing are located the sprinkling-pipes 33, the water to same coming from the tank M on top of the machine through pipe 34. The supply is controlled by valve 41 as to quantity and may be shut off entirely, if desired. There is a suction-pipe 36 connected to the pump O. From pump O the supply passes through pipe 35 to top tank M. The pump is operated from the motor N by endless belt 15. In case of any surplus water accumulating in top tank M the same is returned to well 31 through overflow-pipe 117.

The base A is supported for convenience of moving on truck-wheels 29 30, wheel 29 being the steering-wheel. There is a provision for locomotion, which will be described later. On said base A are also mounted the boxes 114 114, in which run the vertical rotary shafts D' D². Shaft D² derives rotary motion from a motor N on bracket 18, borne on column C to the right. This motor, preferably electric, derives its motion from an outside source of electric energy, the wires from which (not shown) enter at a fuse-block or cut-out 38 on the side of the machine, Fig. 2, preferably inclosed in the form of an insulated flexible cable. From this cut-out the wires pass under the machine, thence up inside the column C at the rear of the machine, which has a passage provided for the purpose, and thence to the motor N. A branch of the circuit which energizes the armature leads through the rheostat 17, the function of which is to govern the starting, stopping, and controlling of the current. Said motor communicates its motion to shaft D² through train of gears 16. Shafts D' D² are connected together by means of endless ropes, belts, chains, or wire cables 82 69, passing around flanged pulleys P P', and rotate together at equal speeds. At the foot of shaft D² is a bevel-pinion 21, intermeshing with bevel-gears 22 23 on the shaft of truck-wheels 30. These bevel-gears are mounted with a spline, so as to have longitudinal motion on the shaft, and are controlled by a lever 19, pivoted at 20, carrying rings 133, which engage grooved collars 132 on the said bevel-gears, by which means the gears can be shifted to the right or left, as desired. The object is to give locomotion to the machine in any direction by power derived from the electric motor N.

As shown in Fig. 23, the handle 19 is in a perpendicular position, in which position the gears 22, 23, and 21 are not in mesh. By moving this handle or lever 19 to the left gears 21 and 22 engage and the machine takes motion and travels slowly on the floor. By moving the handle the other way the gears 21 and 23 mesh and the machine takes motion in the opposite direction. The machine is governed by means of the hand-wheel 25, the shaft 27, and the train of gearing 28 28 28, controlling the floor-wheel 29. The movement is slow and readily under control. The direction back or forward is controlled by the lever 19, the direction to the right or left by hand-wheel 25, and the speed of the machine about the floor is regulated by the rheostat 17, which governs the speed of the motor N.

When the machine is in its position in front of a glass-pot in the furnace, the duty of the motor N is to operate the shaft $D^2$, as above described, and this shaft communicates motion and power to the shaft $D'$ by means of the wire ropes or cables illustrated at 69 and 82. These wire ropes or cables have also the duty of carrying around the frame of the machine pairs of cars—viz., the motor-car E on the top frame and the slicker-car F on the bottom frame. These cars are attached to the cable as follows: The car F is held with clamp 74, Fig. 8, and has fingers or steadying-arms 84, which when the car is on the straightway part of its course come into contact with the cable and prevent vibrations which might occur from any hitching along the track. Similar fingers may be applied to the top motor-car and are in practice, but they are not shown in the drawings. The cable-wheel P has parts cut away in same at 85, which permits the clamps which hold the motor and slicker cars to pass around the wheel smoothly. It also provides for the take-up coupling 24 and the knocker or striker clamps 97 to pass in the same manner. The top cable-wheels and lower ones are of similar construction and have like duties to perform, with the exception of the striker-clamps.

On the tracks H on base A run the slicker-cars. (Shown in detail on Sheet 4, Figs. 7 and 8.) These cars consist of a base portion F, mounted on truck-wheels 83, with means 74 for clamping the same to cable 82, and an upper portion $F'$, supported on the base portion by means of ball-bearings 89 on a circular trackway, so as to rotate freely by means hereinafter to be described. This upper portion carries the slickers G, radially arranged, so as to have free radial movement toward and from the center, while the upper portion $F'$, which carries them, is rotating. The outward movement of the slickers is accomplished by means of cone $u$, bearing against rollers 86, attached to the slickers. Cone $u$ is operated by means of the adjustable and exchangeable cam-track I, whose upper edge is of varying height, in accordance with the work required of it. This cam-track I raises and lowers the flange-wheel $v$ running on the same. Said wheel is borne in a hanger, on top of which is spindle 87, which turns loosely in the stem of the cone $u$ and takes end thrust upon ball-bearings 90. As the slickers revolve around the plastic glass this wheel remains stationary, simply traveling around with the machine on the cam-track I and lifting and lowering the cone $u$ in accordance with the rises and falls in the cam-track I. The lifting of the cone $u$ pushes back the rolls 86, which are attached to the slicker-supports $y$ $y$ $y$. These slicker-supports $y$ have slots 121 formed in same, which guide the said supports as they advance or retreat from the glass. The slickers may be of metal or any other material which will stand the temperature and friction. They are held up to the plastic glass by the springs 76, and the regulation of the advance and retreat is governed by the formation of the cam-track I. The slickers G are slotted at 77 as a means of adjustment and held in position by screw and washer 78.

The slickers are of the shape illustrated in Figs. 15 to 18, inclusive, Sheet 3, and are preferably rounded at their edges, as shown in Fig. 16, and their duty is to slick, smooth, model, or iron the plastic glass into the required shape as they come in contact therewith. In practice they are preferably paste-covered on their contact-faces.

The slickers shown in Figs. 21 and 22 are designed for forming the bottom of a glass article, as shown at 94. They can be of any shape in the reverse that is desired to be imparted to the article of plastic glass in process of formation. This slicker is held in position by arms 93 centrally beneath the rotating slickers. Figs. 19 and 20 represent a means for making the same set of slickers fashion and shape the plastic glass at bottom as well as at the sides, but is adapted only for plain-bottom or straight-bottom glasswork.

The frame-plane B also bears trackways $f$ $f$, on which run the upper motor-cars E. These cars are impelled by the same power and at the same speed as bottom cars F by means of cable 69, driven from shaft $D^2$ and passing over pulleys $P'$. The said cars are connected to said cable by means of connecting-arms $q$ and clamps $h$. They are thus designed to move synchronously with the bottom cars F and remain directly over the same. Between each top and bottom car extends the vertical connecting-rod 122, firmly attached to each car at the sides. This rod carries horizontal arms 113, having at the extremities thereof the blow-iron supports or bearings U U for sustaining the blow-iron T in a vertical position during the entire circuit of the cars. This bearing U, Fig. 31, is cone-shaped, so as to retain the blow-iron, which has a reverse-shaped cone, on same. Said bearing U has an insertible composition piece or bushing 96 for renewal in case of wear. This serves to keep the blow-iron in position and for a bearing. There are two for each pair of cars, as shown in Fig. 1. Figs. 30 and $30^a$ represent a method of constructing the end of the blow-iron so as to fit the clutch for driving the same by means of cross-pins 131. This admits of no difficulty in positively catching the spindle and driving the blow-iron. In the air-spindle is a clutch $r$. This clutch has the proper shape to engage with the blow-iron. There is a flexible washer 42 in the bottom of air-spindle clutch, which makes the blow-iron contact with the clutch air-tight.

The blow-irons T are removable, insertible, and hollow and bear on their lower ends the bulb of plastic glass to be modeled by the slickers during the cycle of operation. This blow-iron receives rotary motion and a supply of air for expanding the glass bulb by means presently to be described. There also extends from the upper to the lower car the vertical rotary shaft 63, whose office it is to impart rotary motion to the revoluble member of the slicker-car F by means of gear-wheel $w$, meshing into circular rack $x$ on the periphery of revoluble member F'. The shaft 63 is run in trunnion-supported boxes 88, attached to both top and bottom cars, so as to be preserved at all times in alinement. It is supported upon ball-bearings.

Besides the car-tracks $f$ there are borne on the upper frame-plane B three adjustable and exchangeable cam-tracks J, K, and L, whose functions are similar to those of cam-track I on base-frame A. These cam-tracks have their upper edges formed of varying heights, in conformity with the functions which they have to perform. The function of cam-track J is to automatically regulate the degree and time of the rising and falling of the blow-iron spindle $p$, which communicates with the vertical blow-iron T and supplies rotary motion and air thereto. The function of the cam-track K is to automatically regulate the air-pressure of the air-supply furnished to the said spindle, and the function of the cam-track L is to automatically control the rheostat-arm of the rheostat W, which regulates the amount of current supplied to the armature of the electric motor V. The said motor V, blow-iron spindle $p$, and rheostat W are all carried on the upper motor-car. The blow-iron spindle receives its supply of air from an external source presently to be described. The said spindle receives its rotary motion from motor V, gears $n$ and $k$, shaft 63, and sprocket-wheels $m$ and $l$. The spindle is splined in the sprocket-wheel $l$, so as to admit of rising-and-falling motion while rotating, and said sprocket-wheel $l$ is confined by a collar 73 and groove 72 from following the rising movement of the spindle. First, as to cam-track L, the armature of the motor V is supplied with current from an external source through the rheostat W. The field-magnets of the motor are supplied with a constant current and remain at all times charged while the machine is in operation. The rheostat W, when the motor-car arrives at the place where the glass is to be put into the machine, automatically turns on a limited supply of current to armature, thus at once starting the machine gradually under automatic regulated speed by means of the cam-track L and flange-wheel 57, increasing the speed of the motor until the operation is completed, at which time the wheel 57 drops and the current is shut off from the motor-armature until next cycle is started upon. Second, as to cam-track K, on which runs the flange-wheel $j$. The duty of this cam-track and wheel is to admit of a discharge of air from an air-box 46, borne on the motor-car E. This air-box 46 receives its supply of air through a flexible pipe X and air-pipe $o$, with a little surplus capacity for carrying air over what is actually required for the largest work to be done with the machine. The diameter of the flexible air-pipe X and pipe $o$ determines the carrying capacity in air. From this air-box 46 the air has two paths open to it, one through chamber 46 to chamber 45 in column 61 through the cross-holes 44 in blow-iron air-spindle to central passage 43 in center of blow-iron air-spindle, thence to plastic glass. Were it not for the escape air-valve 37 too much air-pressure would at once be applied to the delicate plastic glass. Therefore this air-escape valve 37 is provided. When air is admitted to the air-box 46 through the valve 49 at top of air-pipe $o$, the spindle is in the air-box, exposing its opening 47 to the incoming air, offering a free second path for same through this spindle to the outlet-slot 48. As the work of forming the plastic glass commences, but very little air-pressure passes to the inside of the plastic glass, as the escape air-valve 37 is keeping this pressure down. As the forming of plastic glass proceeds in the car below, this valve-spindle 37 gradually or otherwise, if desired, descends by the action of cam-track K and roller $j$, thus decreasing the size of the discharge-opening into this spindle until the air-passage is shut off entirely or to the extent desired as the required pressure may demand, depending upon the work in hand. This method of regulating air-pressure is positive and is capable of giving puffs or impulses, sudden or gradually increasing, as the case may require, by simply having the cam-track arranged accordingly. It can closely imitate the pressure given by a skilled glass-blower when operating difficult work, blowing same by lung-pressure. This enables the air-pressure to be governed absolutely according to the work that is to be done with the machine. Thirdly, as to cam-track at J. The duty of this cam-track is to operate the lifting and lowering of the blow-iron spindle, as beforesaid. The blow-iron spindle is shown, Fig. 12, at its highest position. Immediately after the plastic glass is put into the machine the spindle automatically lowers and engages the clutch $r$ with the end of the blow-iron. There it remains, imparting to the attached blow-iron rotary motion and regulated air until the operation is completed, when it automatically lifts from off the blow-iron, as governed by the formation of the cam-track, releasing said blow-iron and permitting it to be taken out from the machine.

On base A is also borne the hub or boss 118, in which is journaled the central shaft R, passing up through the frame-plane B. This shaft is solid throughout its entire length and has ball-bearings for end thrust at 119. At its top is the air-box 1, carrying the extended flexible pipe X X, one for each car. Into the top of the said air-box and in axial alinement with the rotary shaft R extends the vertical rotary air-pipe 7, communicating with the air-pipe 4, which may be flexible, leading to an external source of air-supply under pressure. 2 is a commutator, presently to be described, forming the connection between the rotary air-pipe 7 and the stationary air-supply pipe 4. The shaft R is stationary most of the time, but receiving periodical impulses. In the present machine it is arranged to give this shaft eight impulses for each operation or during one complete cycle of the cars. This is accomplished by the knockers 97, Fig. 26, striking against the extended arms 98, by which each time they come in contact they advance the wheel one-eighth of a revolution. The object of this operation is to at all times have the flexible air-pipe X approximately in line with the motor-car E. The duty of this flexible pipe is to convey air under pressure to the motor-car from air-supply pipe 4, and also to carry electric wires to the motor on said cars by the interposition of the commutator 2, without which or some similar device the air-pipes and electric wires would become entangled while the machine was making one cycle. This plan admits of air being supplied to the cars under the same pressure at all times, at the same time carrying the wires to the moving cars without any danger of breakage or strain. The flexible pipes pass over a round elbow $e$, thereby preventing any sharp bends in them, whether they are in the position shown in Fig. 1 or Fig. 2. $a$ are lever-arms attached to the flexible air-pipes by means of links $b$ and elbows $e$. These lever-arms are always kept taut through the tension-springs $d$, thus at all times keeping the air-pipes in position and preventing wear or abrasion. The air-pipe X communicates with vertical air-pipe $o$ on the motor-car and supplies air to valve 49, Figs. 27 and 28. The duty of this air-valve is to open as soon as the plastic glass is put into the machine and to close upon the operation being completed. This is accomplished through the striker-pin 52, which is adjustable upon the upright shaft 54. This striker-pin engages with the star-wheel 51 on the air-valve shaft. This star-wheel has eight arms. The air-valve has four openings. (See Fig. 27.) The star-wheel upon receiving one impulse moves until an opening in same is opposite the air-pipe. This allows air to freely pass through the valve and out the other side, Fig. 12. In this position it remains during a blowing of plastic glass. When the glass is blown, the star-wheel receives a second impulse. This impulse closes the valve by bringing the solid part thereof opposite the inlet air-supply. There is one upright shaft 54 at each end of the machine, properly located to perform its proper operation.

58 shows the flange-wheel for lifting the blow-iron spindle by means of the cam-track J, on which it runs. This wheel is held with bearing or collar 59 on blow-iron spindle. It is held in position on the shaft from moving lengthwise by the two collars 60, which are attached to the spindle with screws, and has ball-bearings for end thrust to lessen friction.

The commutator 2 is a metal case and surrounds the pipe 7. (See Figs. 34 and 35.) This commutator-case remains at rest and the pipe 7 revolves inside of same at one-eighth of a revolution to an impulse or one revolution for each cycle of the machine. Electric wires 103 and 104 extend from some external source of energy through the coupling 3 and flexible pipe 4 into the said commutator 2, where they are connected to springs 100, bearing the commutator metal brushes 102. The commutator is built upon an iron or metal bushing, upon which bushing is located the insulating fiber bushing 101. Upon this fiber are the rings of metal 99 99, whereby the metal rings are insulated from each other and from the metal bushing. The conductor-wires 103 and 104 then pass from the said rings into the pipe 7 and thence through pipes X to the motor V and rheostat W by a division. The entire duty of this commutator is to convey the electric current through the pipe 7 to the motors on the motor-cars without becoming twisted. This arrangement insures a positive electric connection to the motor-car at all times, giving one polarity of current to the motor. It will be noticed that but two wires enter the commutator and leave the same; but where the wires emerge from the flexible air-pipe there are four wires, owing to the division above referred to. This will not need further description, as it is the well-known way of taking two wires from any outside source of electric energy and connecting them so as to energize the field-magnets of the electric motor and at the same time control the motor-armature with the rheostat.

As shown in the machine illustrated in the present drawings, four sets of cars can ordinarily be in operation at the same time; but the method is not limited to this number.

In Fig. 1, 8 shows the glass bulb when first put into the machine, before the slickers have closed upon the same and before air from the machine has been supplied.

9 shows the glass after it has nearly taken its final shape, slickers closed upon the same, and the process well under way.

10 shows the glass after the operation has been completed and the motor V come to rest, the air-spindle ready to lift, the slickers open, and the article about ready to be taken from the machine.

11 shows the slicker-car with the slickers wide open and receiving their wetting and cooling, preparing them for a fresh gathering of plastic glass.

On the base A, Fig. 2, is shown attached to one side upon an upright supporting-shaft 124 by a swivel-joint 125 and clamp 126 a flexible pipe 128, bringing air from some extraneous supply to the vicinity of the traversing slickers to cool the glass at the proper stage. This air-blast can be shut off and turned on by a valve similar to one applied on the motor-car at valve 49, or it may be left on all the time, as it can be directed upon the glass only when the latter has reached the proper stage of the process and the proper position on the machine as the slicker-car passes through that part of its cycle. This air-pipe or air-blast may be one pipe or a collection of air-pipes for this purpose.

Operation of the machine: Taking the machine when at a state of rest I will describe the starting of the machine and the completion of one cycle of operation of one pair of motor and slicker cars. The operation is duplicated in the other pairs of cars. First the machine has been brought to its position in front of the furnace through the motor N, the train of gearing 16, the shaft $D^2$, bevel-gears 21, 22, and 23, and the guiding device on front of the machine, consisting of hand-wheel 25, shaft 27, train of gearing 28, and steering-wheel 29. After the machine is duly placed the handle 19 is returned to perpendicular position. The armature of the motor N is then again started by the hand regulating and starting rheostat 17, the radius-arm of which is set at such position as will suit the work in hand, different speeds being required for different-sized work. This starts the cars into movement through shafts $D^2$ $D'$ and cables 69 82, their speed around the machine on their respective tracks being governed by the set of the rheostat-arm. After the speed is once set it remains constant. The motor N also brings into operation the rotary pump O, which supplies water continuously to the top tank M. These operations being all initiated we will suppose that a pair of cars, both motor and slicker, have arrived at the position shown at the extreme left, Fig. 1. At this position the slickers G are at their widest opening apart. The air is shut off from the upper car by air-valve 49 at end of flexible cable X. The blow-iron spindle, with the clutch, is lifted to its highest position. The lever 56 of the rheostat W is at the position where the current is entirely shut off, and the motor is at rest. The air-discharge pressure-valve is at its highest position ready to take air freely and give a free second path for air from air-chamber 46, thus admitting air at low pressure to blow-iron T when it comes on. The operator has now just put in a fresh blow-iron with its fresh gathering of plastic glass thereon into the blow-iron supports or bearings U, with the glass between the slickers. This gathering of glass has first received the slight hand and lung manipulation required of same before being put into the machine. But a slight amount of skill is required to do this. Immediately the slickers close upon the bulb until they come in contact therewith. While this is being done various other movements are taking place on the upper or motor car. The blow-iron clutch has meantime descended into contact with the blow-iron, sealing same air-tight by means of the flexible washer 42 in clutch $r$. (Shown in Fig. 12.) The motor V on the top car has now started slightly, the rheostat-arm 56 having been moved by the operation of cam-track L. This starting of the armature of motor V has, through its connections of gearing and shafts and sprocket-chains through shaft 63, gear $w$, and circular rack $x$, started the slickers into revolution around the gathering of plastic glass 8 on blow-iron T. The blow-iron has started to revolve slowly in the opposite direction, the speed of both increasing as the process proceeds. The valve 49 has now opened, admitting air under full pressure to the motor-car E; but as the escape-valve 37 is still open but a slight amount of pressure is experienced at the plastic glass. The speed increases according to predetermined plan. The air-pressure increases according to predetermined plan, both governed by the cam-tracks L and K. The slickers open gradually, according to plan, as governed by cam-track I, Fig. 7, and the plastic glass has gradually expanded as the slickers have opened until the glass has attained its correct size and approximate final shape. At this time the slickers will remain in this position for awhile until the speed has increased in the motor to its desired limit, all the while revolving the slickers in contact with the revolving article of plastic glass, which now has taken its final shape, being modeled into perfect contour by the revolving paste-covered slickers and smoothed and ironed and slicked until all creases are out of the same. The air-pressure has increased to the limit required for this operation and the air from outside pipe 128 commences to come into contact with the glass, which is now ready to cool and be taken out from between the slickers. This air cooling-blast, which is applied to the outside of the slickers at this stage directly upon the blown glass through the spaces between the slickers, takes place just before the opening of the slickers to harden the glass as much as is practical before taking out the finished product. The pair of cars now goes through the reverse movements. The rheostat-arm shuts current from off the armature in the motor, thus stopping the motion of the same and with it the revolution of the blow-iron spindle and the slickers. The clutch lifts off from the blow-iron. The air-valve 49 closes, shutting off the supply of air from this motor-car. The air-regulating escape spindle-valve 37 lifts, ready for a second operation. The glass article is taken from the machine and the slicker-car advances into the metal housing Q, where the sprinklers are at work throwing a liberal supply of water upon the slickers, which now entirely floods them, wetting their paste-covered surfaces and cooling them thoroughly. When they come from out the housing, they are entirely cool and ready for another cycle of operation.

The operation of one pair of cars is duplicated in the others, the several operations taking place at the same time on different pairs of cars.

The face of the slicker where it comes in contact with the glass is not necessarily of the same arc of curvature as the finished product. The edges or carriers of this face of the slicker are preferably rounded where they are presented to the plastic glass. By this means the plastic-glass article is kneaded, ironed, modeled, smoothed, and slicked into its ultimate shape. This operation is one not possible to be practiced with the sectional mold. In my machine as soon as the bulb of glass has been taken from the furnace, manipulated slightly, and placed in the machine and the machine is started the slickers at once approach each other until they have embraced the plastic-glass bulb on all sides. Immediately the regulated air-blast is admitted and the process of forming or slicking the glass article into shape commences. The slickers as soon as the plastic glass comes into contact with them commence to expand or open, and the expanding glass follows the opening slickers till the article has reached its desired final shape. At this stage the slickers remain a very short time in this position when the air-blast has reached the full pressure required for the article in process, after which it is turned off automatically. During the time that the slickers are expanded to the finished size of the glass article in process the outside air-blast from an external source of air-supply is turned onto the slickers and also the finished product, as before mentioned, which it can readily reach through the spaces or openings between the sides of the slickers, and thus materially assist in cooling the finished product prior to being taken from the machine. As soon as the operation on the plastic glass has been completed the slickers expand to their fullest extent, which gives ample room to remove the finished product. They are then wet and cooled in the sprinkling-house and are ready for a fresh gathering of plastic glass.

At no time during the various contractions and expansions of the slickers do they touch each other. When they first embrace the plastic bulb before the process of expansion takes place, they are very close together, but not in contact.

There are very few articles, such as very small and thick ware, that can be made nearly as well by dispensing with the expansive properties of the slickers. In such cases the slickers can then upon approaching simply close to the exact size of the finished product, remaining there until the article is slicked into shape, and then expand to remove the product. All these movements can be regulated to a nicety by means of the long cam-track I, which admits of any adjustment.

In almost all kinds of work the product is much bettered by beginning the modeling from the first expansion of the plastic glass, as I am enabled to do with this method of employing expansion-slickers. Abrupt irregularities in the finished glass product, such as sharp angles and curves, can be much better worked by beginning to make the glass take its final shape at first, when the bulb is small and very plastic, and causing the expansion to follow the lines of the slickers from there on.

As soon as glass has taken its shape the space between the slickers admits of air getting to the product, and during the last of the operation, when the article is nearly completed, this space between the slickers is sufficient for the air cooling preparatory to taking the product from the machine. This cooling the finished product by air-blast materially aids the machine in increasing its capacity for doing work. It hardens and cools the glass somewhat, so that contact with any hard substance after being removed from the machine is much less liable to dent and injure it. In this invention I may revolve the blow-iron with its gathering of plastic glass and not have the slickers revolve about the plastic glass. I can revolve the slickers about the plastic glass and have the blow-iron remain stationary with its gathering of plastic glass, or I can revolve the blow-iron with its gathering of plastic glass and also revolve the slickers about the plastic glass in conjunction, as the case may require, in opposite directions or at differential speeds in the same direction.

By providing that the slickers shall never come quite together under any circumstances in operation upon the plastic glass I avoid the common trouble in mold-machines of refuse glass from last operation getting between the edges of the mold, and thus spoiling that one operation and running the chance of injuring the mold and machine. I do not limit myself in any manner to applying this invention to the style of frame illustrated in this application, since these slickers are applicable to almost any other type of glass-blowing machines, including those using sectional molds, and will do better work in larger pieces and at the same time more rapidly than is now accomplished with the common sectional mold. This feature can readily be applied to other types of machines by the substitution of the slicker mechanism.

In the type of frame that I illustrate with this machine I obtain many advantages, a few of which I will mention. The machine being a straightway one, the operators that attend or feed it are at one end. They have free access to that part of the machine without interference from the tenders, who remove the finished product at the other end. Immediately upon the glass being put into the machine it begins its retreat from the furnace, continuing to retreat until final removal from the machine. This feature of putting plastic glass in at one end and removing the finished product from the other also adds to the capacity of product that such a machine is capable of, as the tenders each have room for their respective operations uninterfered with. The design also economizes room around the glass-furnace, the machine being narrow and long. This is an advantage, as when two adjoining pots in a glass-furnace are worked they can be worked with less interference in case of a narrow and long machine, reaching away from the furnace.

Each car or set of cars—a top and bottom one working in pairs—perform their operation separately from the other pairs, and by this method of construction a machine is capable of being greatly multiplied in capacity by the addition of pairs of cars. Pairs of cars in this type of machine can be worked on different forms or shapes, if desired, simply by having different sets of slickers for such shapes upon that pair of cars.

It is also a great advantage to make use of the main motor for the purpose of converting the machine temporarily into an electric car by throwing the power-shaft into contact with the truck-wheels by means of bevel-gears, and thus being enabled to move the car or machine from one position to another about the furnace to whichever glass-pot is to be drawn from. This in the past has been accomplished by manual labor, which in such large and heavy machines as glass-machines requires considerable force, which is economized by utilizing mechanical power under perfect control as to speed and direction.

In the foregoing description it is to be understood that the word "slickers" wherever used relates to static fingers or modelers, which operate on the plastic glass by a rubbing or sliding action in contradistinction to revoluble formers, which operate on the glass by a rolling action, on the one hand, or to sectional molds, which inclose the plastic glass and form its shape by compression at all points thereof. It is true that the glass is sometimes rotated in contact with the inner surface of such molds; but it is not modeled to form solely by rubbing contact, as is the case with slickers which nowhere inclose the plastic glass entirely, but leave room on all sides for the accession of cooling blasts of air between said slickers or fingers as the glass rotates in contact with them. This is the radical distinction between molds and slickers. Said slickers or fingers, while static in their operation in the sense that that they do not revolve on axes of their own, like the revoluble formers before referred to, may revolve as a group in place of revolving the plastic glass; but this does not make the term "revoluble" applicable to them as slickers.

I claim and desire to secure by Letters Patent—

1. In a glass-working machine, a plurality of slickers for modeling the exterior of plastic glass, in combination with means for distending said glass with air and supporting the same while so distended in sliding contact with said slickers, substantially as specified.

2. In a glass-working machine, a plurality of slickers for operating on plastic glass, in combination with means for supporting and rotating a mass of plastic glass in simultaneous sliding contact with said slickers, substantially as specified.

3. In a glass-working machine, a plurality of slickers arranged in a circle, in combination with means for distending a mass of plastic glass with air and supporting the same while so distended centrally between and in sliding contact with the said slickers, and means for revolving the slickers about said glass, substantially as specified.

4. In a glass-working machine, in combination, a plurality of slickers arranged in a circle, means for contracting and expanding said slickers toward and from a common center, means for supporting a mass of plastic glass centrally within said circular group of slickers and means for automatically rotating said glass, substantially as specified.

5. In a glass-working machine, in combination, a plurality of slickers arranged in a circle, means for contracting and expanding said slickers toward and from a common center, means for distending a mass of plastic glass with air and supporting the same while so distended centrally within said circular group of slickers, and means for revolving said slickers about said glass, substantially as specified.

6. In a glass-working machine, in combination, a plurality of slickers arranged in a circle, means for contracting and expanding said slickers radially, means for revolubly supporting a mass of plastic glass within said circular group of slickers and means for supplying a blast of air upon said glass between said slickers, substantially as specified.

7. In a glass-working machine, a plurality of slickers in combination with means for supporting and rotating a mass of plastic glass in simultaneous contact with said slickers, and a bottom slicker-support for said glass, substantially as specified.

8. In a glass-working machine, a plurality of slickers arranged in a circle, means for revolubly supporting a mass of plastic glass within said circular group of slickers, means for positively rotating said slickers about said glass, and automatic mechanism for positively rotating said glass, substantially as specified.

9. In a glass-working machine, a plurality of slickers arranged in a circle, automatic mechanism for supporting and positively rotating a mass of plastic glass within said circular group of slickers, and means for contracting and expanding said slickers radially, substantially as specified.

10. In a glass-working machine, a plurality of slickers arranged in a circle, each borne on a carrier, means for contracting and expanding said slickers radially, means for positively rotating said slickers about a common axis, and automatic mechanism for sustaining and positively rotating a mass of plastic glass within said circular group of contracting and expanding slickers, substantially as specified.

11. In a glass-working machine, a plurality of slickers arranged in a circle, means for radially contracting and expanding said slickers toward and from a common center, means for sustaining a mass of plastic glass centrally within said circular group of slickers, means for positively rotating said mass of glass on its axis, and means for supplying a blast of air to the interior of said mass of glass while in rotation, substantially as specified.

12. In a glass-working machine, a plurality of slickers arranged in a circle, means for radially contracting and expanding said slickers toward and from a common center, means for rotating said slickers about a common axis, means for sustaining a mass of plastic glass within said circular group of slickers, means for positively rotating said mass of glass on its axis, and means for supplying a blast of air to the interior of said glass while rotating, substantially as specified.

13. In a glass-working machine, a plurality of slickers arranged in a circle, means for sustaining a mass of plastic glass within said circular group of slickers, means for rotating said glass, and means for supplying a blast of air under regulated pressure to the interior of said glass, substantially as specified.

14. In a glass-working machine, a plurality of slickers arranged in a circle, means for rotating said slickers about a common axis, means for sustaining a mass of plastic glass within said circular group of slickers, and means for supplying a blast of air under regulated pressure to the interior of said plastic glass, substantially as specified.

15. In a glass-working machine, in combination, a plurality of slickers arranged in a circle, means for revolubly sustaining a mass of plastic glass within said circular group of slickers, means for supplying air to the interior of said plastic glass under pressure, and an automatically-operated air-escape valve, in communication with said means of air-supply, whereby the air-pressure supplied to the said glass is regulated and controlled according to the work in hand, substantially as specified.

16. In a glass-working machine, a plurality of slickers arranged in a circle, means for contracting and expanding said slickers toward and from a common center, means for supporting a mass of hot plastic glass within said circular group of slickers, means for traversing said group of slickers and said glass along a trackway, and means for wetting and cooling said slickers when in the expanded condition, after contact with the heated glass, substantially as specified.

17. In a glass-working machine, a vehicle, having a bottom portion mounted on wheels, and a top portion revolubly sustained on the bottom portion, said top portion carrying a group of slickers, two or more, with means for contracting and expanding the same radially toward and from a common center, substantially as specified.

18. In a glass-working machine, a vehicle, having a bottom portion mounted on wheels, and a top portion revolubly sustained on said bottom portion, said top portion carrying a group of slickers, two or more, means for contracting and expanding said slickers radially toward and from a common center, means for impelling said vehicle along a trackway, and means for simultaneously rotating said top portion upon said bottom portion, substantially as specified.

19. In a glass-working machine, a vehicle, having a bottom portion mounted on wheels, and a top portion revolubly sustained on said bottom portion, said top portion carrying a group of slickers, two or more, mounted so as to be capable of contracting and expanding radially toward and from a common center, a rising-and-falling cone engaging said slickers to expand the same, and flanged pulley $v$, in combination with a cam-track I, on which said pulley traverses, thereby governing the rise and fall of said cone, substantially as specified.

20. In a glass-working machine, a vehicle having a bottom portion mounted on wheels, and a top portion revolubly sustained on said bottom portion, said top portion carrying a contractible and expansible group of slickers, in combination with an endless horizontal cable connected to said bottom portion, means for traversing said cable, and means for rotating said top portion while traversing, substantially as specified.

21. In a glass-working machine, a frame-base with endless trackways thereon, a frame-plane above said base with endless trackways thereon, wheeled vehicles running on said lower and upper trackways, means for impelling said vehicles, and a vertical connection between said upper and lower vehicles, substantially as specified.

22. In a glass-working machine, an elevated frame-plane having endless trackways, a wheeled vehicle adapted to run in said trackway, means for impelling said vehicle around said trackway, a portable motor on said vehicle, a rheostat, and lever-arm, in combination with a cam-track L, coöperating with said rheostat-arm for regulating and controlling the amount of current admitted to the armature of said motor, substantially as specified.

23. In a glass-working machine, a wheeled vehicle running on an elevated trackway, a portable air-chamber and air-escape valve carried on said vehicle, and means for supplying air to said air-chamber, in combination with a stationary cam-track coöperating with said air-escape valve, for automatically regulating and controlling the air-pressure in said air-chamber, substantially as specified.

24. In a glass-working machine, a wheeled vehicle running on an elevated trackway, a portable air-spindle carried on said vehicle, adapted to rise and fall vertically, means for rotating said air-spindle, and means for supplying air to said air-spindle under regulated pressure, in combination with a stationary cam-track coöperating with said air-spindle to automatically regulate and control the rising and falling of the same, substantially as specified.

25. In a glass-working machine, a base-trackway, an elevated trackway, wheeled vehicles running on said trackways, means for moving said vehicles simultaneously, and vertical rigid connections, attached to said upper and lower vehicles, carrying horizontal arms 113 and bearings U for blow-irons, substantially as specified.

26. In a glass-working machine, a frame-base, an elevated frame-plane, supporting-columns C C, telescopic screw-threaded extensions $C'$ $C^2$, and screw-threaded hand-wheels $Y'$ $Y^2$, for adjusting the height of said frame-plane, substantially as specified.

27. In a glass-working machine, an elevated frame-plane with endless trackways, a wheeled vehicle running on said trackways, an endless cable with means for impelling the same, and a pivoted arm and clamp $h$ rigidly connected to said vehicle by vertical extension $q$, substantially as specified.

28. In a glass-working machine, a wheeled vehicle running on a base-trackway, a wheeled vehicle running on an elevated trackway, means for simultaneously impelling said vehicles around said trackways, a rotary group of slickers carried on said lower vehicle, a motor carried on said upper vehicle, and a vertical rotary shaft 63 held in trunnion-boxes, extending from said upper vehicle to said lower vehicle communicating rotary motion from said motor to said rotary group of slickers by means of pinion $w$ and circular rack $x$, substantially as specified.

29. In a glass-working machine, a frame-base, an elevated plane, vertical rotary shafts $D'$ $D^2$, flanged pulleys $P'$ $P^2$, endless cables 69, 82, a central solid shaft R extending upward through frame-plane B, a radial-armed wheel S, in combination with lugs 97 carried on endless cable 82, for giving intermittent rotary motion to said shaft S, substantially as specified.

30. In a glass-working machine, a frame-base, supported on truck-wheels 29, 30, an electric motor borne by said base, gearing between said electric motor and said truck-wheels, and shifting gears for throwing the connecting mechanism in and out of gear on each side alternately, whereby the machine is made automobile and the direction of motion forward or backward is controlled at will, substantially as specified.

31. In a glass-working machine, a frame-base, supported on truck-wheels 30 on a common shaft, and a steering-wheel 29, shifting gears splined on said common shaft 135, means for shifting said gears to the right or left on said shaft 135, intermediate pinion 21 vertical shaft $D^2$, motor 17, and intermediate gears 16, whereby the machine is automobile, substantially as specified.

32. In a glass-working machine, a frame-base, having an endless trackway, wheeled vehicles running on said trackways carrying rotary groups of slickers, means for contracting and expanding said slickers toward and from a common center, at predetermined times, means for holding a mass of hot plastic glass in contact with said slickers, a housing built over one portion of said trackway, and sprinkling-pipes in said housing, whereby said slickers are wetted and cooled when in the expanded condition, substantially as specified.

33. In a glass-working machine, a frame-base, having a well therein, an elevated frame-plane, having a water-tank thereon, vertical pipe connections for supply and overflow between said frame-base and said frame-plane, and a pump, for elevating water from said well to said tank, substantially as specified.

34. In a glass-working machine, a frame-base, a frame-plane supported thereon by extensible columns, upright rotary shafts $O'$ $O^2$, endless cable connections between said shafts, and a motor borne on the machine with gear connections for supplying motion to said shafts, substantially as specified.

35. In a glass-working machine, a frame-base having an endless trackway for vehicles thereon, an elevated frame-plane having an endless trackway for vehicles thereon, and extensible supporting-columns between said base and elevated frame, substantially as specified.

36. In a glass-working machine, a frame-base having an endless trackway thereon, an elevated frame-plane having an endless trackway thereon, wheeled vehicles to run on said trackways, endless cables for impelling said vehicles, a motor for operating said cables, a vertical connection between said vehicles, glass-working machinery borne on the lower vehicles, an automatic air-pressure regulator, a rotary rising-and-falling air-spindle, and a traveling motor borne on the upper vehicle, and means for automatically governing said air-pressure regulator said traveling motor and said rising-and-falling air-spindle, substantially as specified.

37. In a glass-working machine, a frame-base having an endless trackway thereon, a wheeled vehicle running on said trackway, contracting and expanding slickers borne on said vehicle, for operating on plastic glass, means for supporting hot plastic glass for treatment by said slickers, and a stationary air-blast for cooling said glass at a proper stage of the operation, substantially as specified.

38. In a glass-working machine, an endless trackway, a wheeled vehicle running thereon, contracting and expanding slickers borne on said vehicle, means for supporting a mass of plastic glass between said slickers, means for automatically revolving said slickers about the glass, means for automatically contracting and expanding said slickers in contact with the glass, means for expanding the glass, means for cooling the glass, and means for wetting and cooling the slickers after the removal of the glass, substantially as specified.

39. In a glass-working machine, upper and lower endless trackways, wheeled vehicles running thereon, a stationary motor for impelling said vehicles, a traveling motor for operating the glass-working machinery, slicker mechanism for manipulating the glass borne on the lower running vehicles, and automatic machinery for regulating air-pressure borne on the upper running vehicles, substantially as specified.

40. In a glass-working machine, a frame-base having an endless trackway, an upper frame-plane having an endless trackway, wheeled vehicles running on said trackways, means for impelling said vehicles, vertical connections between said vehicles, bearing blow-iron supports, a removable blow-iron borne in said supports, means for rotating said blow-iron and supplying air thereto under regulated pressure borne on said upper vehicle, contracting and expanding slicker mechanism borne on said lower vehicles a stationary air-pipe for cooling hot glass, and stationary sprinkling-pipes for wetting and cooling hot slickers, substantially as specified.

41. In a glass-working machine, a blow-iron spindle, having transverse V-shaped notches, and a washer 42, in combination with a blow-iron, having transverse pins 131 for engagement with said notches, substantially as specified.

42. In a glass-working machine, the combination of the traveling air-box 46, air-supply pipe o, air-escape valve 47 traveling pulley j, cam-track K, and rotary air-spindle p, substantially as specified.

43. In a glass-working machine, the combination of the vertical shaft S, with means for intermittently rotating the same, the air-box 1, carrying branching flexible pipes X, portable air-pipes o, vertical air-pipe 7, and stationary inlet-pipe 4, substantially as specified.

44. In a glass-working machine, the combination of the vertical solid shaft R, air-box 1, rotary air-pipe 7, stationary inlet-pipe 4, flexible air branches X, pivoted sustaining-levers a, and springs d, substantially as specified.

45. The combination of the air-box 1, flexible air branches X, spring sustaining-levers a, and curved elbow-supports e, for protecting the flexure of air branches X, substantially as specified.

46. The combination of the stationary air-inlet pipe 4, commutator 2, rotary pipe 7, air-box 1, and branch pipes X, with conductor-wires 103, 104, making rotary connection within the commutator 2, substantially as specified.

47. The combination of the frame-base A, having endless trackway H, and wheeled vehicles running thereon carrying rotary group of slickers G, with the swiveled stationary air-pipe 128, substantially as specified.

48. The combination of endless cable 82, notched pulley P, clamp 74, and wheeled vehicle F, with steadying-arms 84, for preventing vibrations in the moving vehicle, substantially as specified.

49. The slicker G, having adjusting-slot 77, in combination with slicker-support y, having slots 121, substantially as specified.

50. The combination with the slicker G, slicker-support y, slotted as at 121, pulley 86, springs 76, and cone u, substantially as specified.

51. The combination of slickers G, slicker-supports y, bottom slicker 2, and cone u, substantially as specified.

52. The combination of cone u, flanged wheel v journaled stem 87, ball-bearings 90, and cam-track I, substantially as specified.

53. The combination of striker-wheel S, endless cable 82, strikers 97, and flanged wheels P, having notches 85, substantially as specified.

54. The combination of flexible air-pipe X, standing air-pipe o, rotary air-valve 49, star-wheel 51, and stationary striker 52, substantially as specified.

55. The slickers 91, having bottom extensions 92, for supporting and forming the bottom of the plastic-glass article, substantially as specified.

56. The upright standards 122, having arms 113, and bearings U, with renewable bushings 96, substantially as specified.

57. The blow-iron T, having conical enlargement 95, in combination with bearing U having slotted side, and renewable bushing 96, substantially as specified.

58. The combination of an endless trackway, wheeled vehicles to run thereon, glass-working machinery borne on said vehicles, and an endless cable for impelling said vehicles around the trackway, substantially as specified.

59. The slicker G, having rounded edges, and adjusting-slots, substantially as specified.

In testimony whereof I affix my signature in presence of two witnesses.

IRVING W. COLBURN.

Witnesses:
F. A. CURRIER,
BESSIE W. BLANCHARD.